United States Patent
Lightner et al.

(10) Patent No.: US 9,348,573 B2
(45) Date of Patent: May 24, 2016

(54) INSTALLATION AND FAULT HANDLING IN A DISTRIBUTED SYSTEM UTILIZING SUPERVISOR AND DEPENDENCY MANAGER NODES

(71) Applicant: QBASE, LLC, Reston, VA (US)

(72) Inventors: Scott Lightner, Leesburg, VA (US); Franz Weckesser, Spring Valley, OH (US)

(73) Assignee: QBASE, LLC, Reston, VA (US)

( * ) Notice: Subject to any disclaimer, the term of this patent is extended or adjusted under 35 U.S.C. 154(b) by 0 days.

(21) Appl. No.: 14/558,009

(22) Filed: Dec. 2, 2014

(65) Prior Publication Data

US 2015/0154233 A1 Jun. 4, 2015

Related U.S. Application Data

(60) Provisional application No. 61/910,860, filed on Dec. 2, 2013.

(51) Int. Cl.
*G06F 9/445* (2006.01)
*G06F 11/30* (2006.01)
*G06F 11/14* (2006.01)
(Continued)

(52) U.S. Cl.
CPC .............. *G06F 8/61* (2013.01); *G06F 11/1438* (2013.01); *G06F 11/2025* (2013.01); *G06F 11/2028* (2013.01); *G06F 11/30* (2013.01); *G06F 11/3006* (2013.01); *G06F 8/65* (2013.01); *G06F 17/30289* (2013.01); *G06F 17/30587* (2013.01)

(58) Field of Classification Search
None
See application file for complete search history.

(56) References Cited

U.S. PATENT DOCUMENTS 6,128,660 A 10/2000 Grimm et al.
6,178,529 B1 1/2001 Short et al.
(Continued)

FOREIGN PATENT DOCUMENTS

WO 2013/003770 A2 1/2013

OTHER PUBLICATIONS

Bouchenak, S., "Architecture-Based Autonomous Repair Management: An Application to J2EE Clusters", Proceedings of the 24th IEEE Symposium on Reliable Distributed Systems [online], 2005 [retrieved Dec. 16, 2015], Retreived from Internet: <URL:http://ieeexplore.ieee.org/stamp/stamp.jsp?tp=&arnumber=1541181>, pp. 1-12.*

(Continued)

*Primary Examiner* — Todd Aguilera
(74) *Attorney, Agent, or Firm* — Eric L. Sophir; Dentons US LLP

(57) ABSTRACT

The present disclosure relates to in-memory databases or search engines using a dependency manager or configuration manager for maintaining configuration in the database system. The system may include a supervisor that may request and receive data from dependency manager, where the supervisor may be linked to other components in the system. The dependency manager may be used as a container for data metadata, and software components, which may be used in the system configuration. The configuration may be developed through a dependency system, where the dependency manager may keep an entire dependency tree for all software and data in the system. Similarly, dependency manager may create a deployable package to guarantee deployment integrity and to ensure a successful execution of any suitable software and data in the system.

11 Claims, 4 Drawing Sheets

(51) Int. Cl.
*G06F 11/20* (2006.01)
*G06F 17/30* (2006.01)

(56) References Cited

U.S. PATENT DOCUMENTS

| | | | |
|---|---|---|---|
| 6,266,781 B1 | 7/2001 | Chung et al. | |
| 6,353,926 B1* | 3/2002 | Parthesarathy et al. | 717/170 |
| 6,457,026 B1 | 9/2002 | Graham et al. | |
| 6,738,759 B1 | 5/2004 | Wheeler et al. | |
| 6,832,373 B2* | 12/2004 | O'Neill | 717/171 |
| 6,832,737 B2 | 12/2004 | Karlsson et al. | |
| 7,058,846 B1 | 6/2006 | Kelkar et al. | |
| 7,370,323 B2* | 5/2008 | Marinelli et al. | 717/173 |
| 7,421,478 B1 | 9/2008 | Muchow | |
| 7,447,940 B2 | 11/2008 | Peddada | |
| 7,543,174 B1 | 6/2009 | van Rietschote et al. | |
| 7,681,075 B2 | 3/2010 | Havemose et al. | |
| 7,818,615 B2 | 10/2010 | Krajewski et al. | |
| 7,899,871 B1 | 3/2011 | Kumar et al. | |
| 8,055,933 B2 | 11/2011 | Jaehde et al. | |
| 8,122,026 B1 | 2/2012 | Laroco et al. | |
| 8,332,258 B1 | 12/2012 | Shaw | |
| 8,341,622 B1* | 12/2012 | Eatough | 717/177 |
| 8,345,998 B2 | 1/2013 | Malik et al. | |
| 8,356,036 B2 | 1/2013 | Betchel et al. | |
| 8,375,073 B1 | 2/2013 | Jain | |
| 8,423,522 B2 | 4/2013 | Lang et al. | |
| 8,429,256 B2* | 4/2013 | Vidal et al. | 709/221 |
| 8,726,267 B2* | 5/2014 | Li et al. | 717/173 |
| 8,782,018 B2 | 7/2014 | Shim et al. | |
| 8,995,717 B2 | 3/2015 | Cheng et al. | |
| 9,009,153 B2 | 4/2015 | Kahn et al. | |
| 9,025,892 B1* | 5/2015 | Lightner | H03M 7/30 382/232 |
| 9,032,387 B1* | 5/2015 | Hill | G06F 8/61 717/173 |
| 9,087,005 B2* | 7/2015 | Chen | G06F 11/1438 |
| 9,201,744 B2* | 12/2015 | Lightner | G06F 11/2023 |
| 2001/0037398 A1 | 11/2001 | Chao et al. | |
| 2002/0165847 A1 | 11/2002 | McCartney et al. | |
| 2002/0174138 A1 | 11/2002 | Nakamura | |
| 2003/0028869 A1* | 2/2003 | Drake et al. | 717/177 |
| 2003/0112792 A1 | 6/2003 | Cranor et al. | |
| 2003/0158839 A1 | 8/2003 | Faybishenko et al. | |
| 2003/0182282 A1 | 9/2003 | Ripley | |
| 2004/0010502 A1 | 1/2004 | Bomfim et al. | |
| 2004/0027349 A1 | 2/2004 | Landau et al. | |
| 2004/0049478 A1 | 3/2004 | Jasper | |
| 2004/0143571 A1 | 7/2004 | Bjornson et al. | |
| 2004/0153869 A1* | 8/2004 | Marinelli et al. | 714/47 |
| 2004/0205064 A1 | 10/2004 | Zhou et al. | |
| 2004/0215755 A1* | 10/2004 | O'Neill | 709/223 |
| 2005/0192994 A1 | 9/2005 | Caldwell et al. | |
| 2006/0101081 A1 | 5/2006 | Lin et al. | |
| 2006/0294071 A1 | 12/2006 | Weare et al. | |
| 2007/0005639 A1 | 1/2007 | Gaussier et al. | |
| 2007/0073708 A1 | 3/2007 | Smith et al. | |
| 2007/0203693 A1 | 8/2007 | Estes | |
| 2007/0203924 A1 | 8/2007 | Guha et al. | |
| 2007/0240152 A1* | 10/2007 | Li et al. | 717/174 |
| 2007/0250519 A1 | 10/2007 | Fineberg et al. | |
| 2007/0282959 A1 | 12/2007 | Stern | |
| 2008/0010683 A1 | 1/2008 | Baddour et al. | |
| 2008/0027920 A1 | 1/2008 | Schipunov et al. | |
| 2009/0019013 A1 | 1/2009 | Tareen et al. | |
| 2009/0043792 A1 | 2/2009 | Barsness et al. | |
| 2009/0049038 A1 | 2/2009 | Gross | |
| 2009/0089626 A1 | 4/2009 | Gotch et al. | |
| 2009/0094484 A1 | 4/2009 | Son et al. | |
| 2009/0144609 A1 | 6/2009 | Liang et al. | |
| 2009/0216734 A1 | 8/2009 | Aghajanyan et al. | |
| 2009/0240682 A1 | 9/2009 | Balmin et al. | |
| 2009/0292660 A1 | 11/2009 | Behal et al. | |
| 2009/0299999 A1 | 12/2009 | Loui et al. | |
| 2009/0322756 A1 | 12/2009 | Robertson et al. | |
| 2010/0077001 A1 | 3/2010 | Vogel et al. | |
| 2010/0138931 A1 | 6/2010 | Thorley et al. | |
| 2010/0223264 A1 | 9/2010 | Brucker et al. | |
| 2010/0235311 A1 | 9/2010 | Cao et al. | |
| 2010/0274785 A1 | 10/2010 | Procopiuc et al. | |
| 2011/0071975 A1 | 3/2011 | Friedlander et al. | |
| 2011/0093471 A1 | 4/2011 | Brockway et al. | |
| 2011/0119243 A1 | 5/2011 | Diamond et al. | |
| 2011/0125764 A1 | 5/2011 | Carmel et al. | |
| 2011/0282888 A1 | 11/2011 | Koperski et al. | |
| 2011/0296390 A1* | 12/2011 | Vidal | G06F 8/65 717/168 |
| 2011/0296397 A1* | 12/2011 | Vidal et al. | 717/171 |
| 2012/0030220 A1 | 2/2012 | Edwards et al. | |
| 2012/0059839 A1 | 3/2012 | Andrade et al. | |
| 2012/0102121 A1 | 4/2012 | Wu et al. | |
| 2012/0117069 A1 | 5/2012 | Kawanishi et al. | |
| 2012/0131139 A1 | 5/2012 | Siripurapu et al. | |
| 2012/0246154 A1 | 9/2012 | Duan et al. | |
| 2012/0310934 A1 | 12/2012 | Peh et al. | |
| 2012/0323839 A1 | 12/2012 | Kiciman et al. | |
| 2013/0132405 A1 | 5/2013 | Bestgen et al. | |
| 2013/0166480 A1 | 6/2013 | Popescu et al. | |
| 2013/0166547 A1 | 6/2013 | Pasumarthi et al. | |
| 2013/0290232 A1 | 10/2013 | Tsytsarau et al. | |
| 2013/0303198 A1 | 11/2013 | Sadasivam et al. | |
| 2013/0325660 A1 | 12/2013 | Callaway | |
| 2013/0326325 A1 | 12/2013 | De et al. | |
| 2014/0013233 A1 | 1/2014 | Ahlberg et al. | |
| 2014/0022100 A1 | 1/2014 | Fallon et al. | |
| 2014/0089237 A1 | 3/2014 | Adibi | |
| 2014/0156634 A1 | 6/2014 | Buchmann et al. | |
| 2014/0244550 A1 | 8/2014 | Jin et al. | |
| 2014/0255003 A1 | 9/2014 | Abramson et al. | |
| 2014/0280183 A1 | 9/2014 | Brown et al. | |
| 2014/0351233 A1 | 11/2014 | Crupi et al. | |
| 2015/0074037 A1 | 3/2015 | Sarferaz | |
| 2015/0154079 A1* | 6/2015 | Lightner | G06F 11/203 714/4.11 |
| 2015/0154194 A1* | 6/2015 | Lightner | G06F 17/3053 707/730 |
| 2015/0154200 A1* | 6/2015 | Lightner | G06F 17/3053 707/693 |
| 2015/0154264 A1* | 6/2015 | Lightner | G06F 17/30542 707/780 |
| 2015/0154283 A1* | 6/2015 | Lightner | G06F 11/3409 707/770 |
| 2015/0154286 A1* | 6/2015 | Lightner | G06F 19/24 707/728 |
| 2015/0154297 A1* | 6/2015 | Lightner | G06F 17/30545 707/722 |

OTHER PUBLICATIONS

Vizard, M., "The Rise of In-Memory Databases", Dice [online], 2012 [retrieved Jan. 21, 2016], Retrieved from Internet: <URL: http://insights.dice.com/2012/07/13/the-rise-of-in-memory-databases/>, pp. 1-3.*

International Search Report and Written Opinion of the International Searching Authority dated Apr. 15, 2015 corresponding to International Patent Application No. PCT/US2014/068002, 10 pages.

International Search Report and Written Opinion dated Mar. 6, 2015 corresponding to International Patent Application No. PCT/US2014/067993, 9 pages.

International Search Report and Written Opinion of the International Searching Authority dated Mar. 3, 2015 corresponding to International Patent Application No. PCT/US2014/067921, 10 pages.

International Search Report and Written Opinion of the International Searching Authority dated Feb. 24, 2015 corresponding to International Patent Application No. PCT/US2014/067918, 10 pages.

International Search Report and Written Opinion of the International Searching Authority dated Mar. 10, 2015 corresponding to International Patent Application No. PCT/US2014/067999, 10 pages.

Tunkelang, D., "Faceted Search," Morgan & Claypool Publ., 2009, pp. i-79.

(56) References Cited

OTHER PUBLICATIONS

Schuth, A., et al., "University of Amsterdam Data Centric Ad Hoc and Faceted Search Runs," ISLA, 2012, pp. 155-160.
Tools, Search Query Suggestions using ElasticSearch via Shingle Filter and Facets, Nov. 2012, pp. 1-12.
International Search Report and Written Opinion of the International Searching Authority dated Apr. 15, 2015, aorresponding to International Patent Application No. PCT/2014/067994, 9 pages.
Nang, et al., "Automatic Online News Issue Construction in Web Environment," WWW 2008/Refereed Track: Search—Applications, Apr. 21-25, 2008—Beijing, China, pp. 457-466.
Biel et al., "Latent Dirichlet Allocation" Journal of Machine Learning Research 3 (2003), pp. 993-1022.
Chuang et al., "A Practical Web-based Approach to Generating Topic Hierarchy for Text Segments," CIKM '04, Nov. 8-13, 2004, Washington, DC, USA, Copyright 2004 ACM 1-58113-874-0/04/0011, pp. 127-136.

* cited by examiner

INSTALLATION AND FAULT HANDLING IN A DISTRIBUTED SYSTEM UTILIZING SUPERVISOR AND DEPENDENCY MANAGER NODES

CROSS-REFERENCE TO RELATED APPLICATIONS

This non-provisional patent application claims the benefit of U.S. Provisional Application No. 61/910,860, entitled "Dependency Manager for Databases," filed Dec. 2, 2013, which is hereby incorporated by reference in its entirety.

This application is related to U.S. patent application Ser. No. 14/557,794, entitled "Method for Disambiguating Features in Unstructured Text," filed Dec. 2, 2014; U.S. patent application Ser. No. 14/558,300, entitled "Event Detection Through Text Analysis Using Trained Event Template Models," filed Dec. 2, 2014; U.S. patent application Ser. No. 14/557,807, entitled "Method for Facet Searching and Search Suggestions," filed Dec. 2, 2014; U.S. patent application Ser. No. 14/558,254, entitled "Design and Implementation of Clustered In-Memory Database," filed Dec. 2, 2014, U.S. patent application Ser. No. 14/557,827, entitled "Real-Time Distributed In Memory Search Architecture," filed Dec. 2, 2014; U.S. patent application Ser. No. 14/557,951, entitled "Fault Tolerant Architecture for Distributed Computing Systems," filed Dec. 2, 2014; U.S. patent application Ser. No. 14/558,055, entitled "Pluggable Architecture for Embedding Analytics in Clustered In-Memory Databases," filed Dec. 2, 2014; U.S. patent application Ser. No. 14/558,101, entitled "Non-Exclusionary Search Within In-Memory Databases," filed Dec. 2, 2014; and U.S. patent application Ser. No. 14/557,900, entitled "Data record compression with progressive and/or selective decompression," filed Dec. 2, 2014; each of which are incorporated herein by reference in their entirety.

FIELD OF THE DISCLOSURE

The present disclosure relates in general to databases, and more particularly, to a dependency manager that may be used for in-memory databases.

BACKGROUND

Package management systems may be designed to save organizations time and money through remote administration and software distribution technology that may eliminate the need for manual installation and updates for any suitable component, such as, software, operating system component, application program, support library, application data, general documentation, and other data, from a system or process. One conventional approach in the art related to package management system may be the Red Hat package manager (RPM). Package managers may present a uniform way to install and/or update software programs and associated components.

To install a set of software or data packages, a package manager may order the packages and its dependent packages in topological order onto a graph. Subsequently, the package manager may collect the packages at the bottom of the graph and install these packages first. Finally, the package manager may move up the graph and install the next set of packages.

However, the conventional approach in the art related to database management systems refers that some package managers may only keep the software configuration in the system, but may not support metadata or primary data collection dependencies. In a database, particularly an in-memory database or other distributed storage architectures, deployment focuses as much on data as software, and therefore maintaining dependency trees required for data deployment are essential.

Conventional technologies may automate deployment, installation, and configuration of software components and associated dependencies, across a cluster of one or more computers in a convectional distributed computing architectures. What is needed is a solution to automate the deployment, installation, and configuration of data, metadata and software of a primary datastore of a distributed database, in a distributed computing architecture, such as in-memory databases and other distributed data platforms. Moreover, because conventional solutions focus on deploying a static set of services and data, conventional systems lack the ability to detect service or data failures and then automatically recover from those failures by moving a package of data, metadata and software to other available nodes in the distributed system.

For the aforementioned reasons, there is a need for an improved package management application to guarantee/keep a successful execution of the system configuration and dependencies into a data management system.

SUMMARY

Disclosed herein are systems and methods for handling dependencies during the process of installing, upgrading, and configuring different software, data or metadata packages for any suitable database or search engine. The systems and methods may automate processes for deploying, installing, and configuring various data, metadata, and software stored in a primary datastore of the distributed-computing system, such as a distributed system hosting an in-memory database, or other types of distributed data platforms. Exemplary embodiments may describe systems and methods in which a dependency manager (configuration management) may be linked directly to a supervisor (systems management), where supervisor may maintain the system in a fully functional manner, and may accept configuration requests to make changes in the system.

In one embodiment, a computer-implemented method comprises transmitting, by a computer of a distributed computing system, a request for a machine-readable deployable-package file associated with a target node of the system to a dependency manager node comprising a non-transitory machine-readable storage medium storing one or more deployable package files associated respectively with one or more nodes of the system according to dependency tree; transmitting, by the computer, the deployable package file to the target node in response to receiving the deployable package file from the dependency node, wherein the deployable package file associated with the target node contains a set of one or more dependency files based on the dependency tree; and instructing, by the computer, the target node to install the set of dependencies in the deployable package onto the target node.

In another embodiment, a computer-implemented method comprises determining, by a computer, a set of one or more dependency files to be installed onto a target node using a dependency tree associated with the target node responsive to receiving a request to configure the target node from a supervisor node; fetching, by the computer, each of the dependency files of the set of one or more dependency files from at least one dataframe comprising non-transitory machine-readable storage medium storing one or more dependency files; generating, by the computer, a deployable package file comprising the set of one or more dependency files; and transmitting, by the computer, the deployable package file to the supervisor node.

In another embodiment, a database management system comprises one or more nodes comprising a non-transitory machine-readable storage memory storing one or more dependency files, and a processor monitoring a status of the one or more dependency files, wherein each respective dependency file is a component of the node having a comparative relationship with a corresponding component installed on a second node; one or more supervisor nodes comprising a processor monitoring a status for each of the one or more nodes and configured to transmit a deployable package comprising a set of dependencies files to each of the nodes based on the status of each respective node; and one or more dependency manager nodes comprising a non-transitory machine-readable storage medium storing one or more dependency tree files associated with the one or more nodes, and a processor configured to compile a deployable package file in accordance with a dependency tree associated with a node, wherein the deployable package file comprises a set of one or more dependencies files stored on at least one data frame, and wherein the dependency manager node determines a dependency to include in the deployable package based on a dependency tree associated with a node targeted to receive the deployable package.

Numerous other aspects, features of the present disclosure may be made apparent from the following detailed description. Additional features and advantages of an embodiment will be set forth in the description which follows, and in part will be apparent from the description. The objectives and other advantages of the invention will be realized and attained by the structure particularly pointed out in the exemplary embodiments in the written description and claims hereof as well as the appended drawings.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DEFINITIONS

Figure 1:
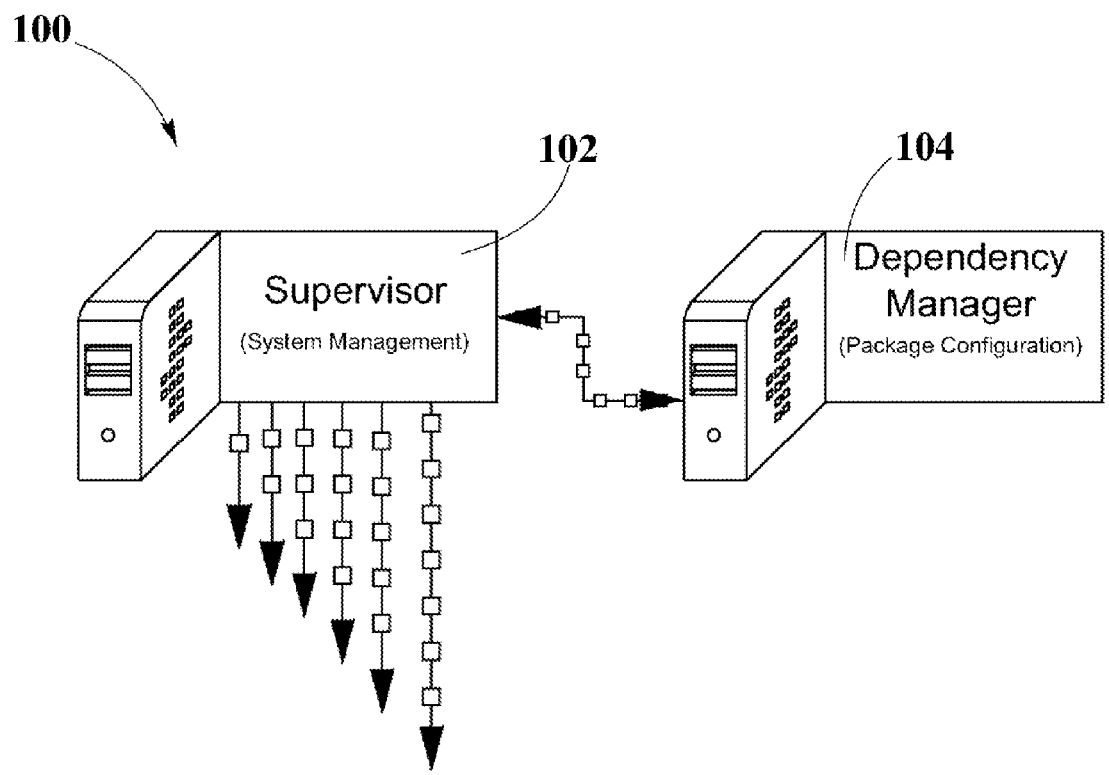
FIG. 1 illustrates a block diagram connection of supervisor and dependency manager, according to an embodiment.

As used herein, the following terms have the following definitions:

"Dependency Tree" refers to a type of data structure, which may show the relationship of partitions, modules, files, or data, among others.

"Deployable Package" refers to a set of information, which may be used in the configuration of modules, partitions, files, or data, among others.

"Node" refers to a computer hardware configuration suitable for running one or more modules.

"Cluster" refers to a set of one or more nodes.

"Module" refers to a computer software component suitable for carrying out one or more defined tasks.

"Partition" refers to an arbitrarily delimited portion of records of a collection.

"Collection" refers to a discrete set of records.

"Record" refers to one or more pieces of information that may be handled as a unit.

"Node Manager", refers to a module configured to at least perform one or more commands on a node and communicate with one or more supervisors.

"Heartbeat", refers to a signal communicating at least one or more statuses to one or more supervisors.

"Supervisor", refers to a configuration/monitoring module that may create and execute plans for change in response to changes one or more statuses or to external requests for change.

"Database" refers to any system including any combination of clusters and modules suitable for storing one or more collections and suitable to process one or more queries.

"Dependency Manager", refers to a module configured to at least include one or more dependency trees associated with one or more modules, partitions, or suitable combinations, in a system; to at least receive a request for information relating to any one or more suitable portions of said one or more dependency trees; and to at least return one or more configurations derived from said portions.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Conventional solutions focus on deploying a fairly static set of services, and so conventional solutions typically lack the functionality required to detect failures of system components and then automatically recover by moving a package of data, metadata, and/or software, to other available nodes in the distributed system.

According to one embodiment, a dependency manager may be used as a container for the maintenance or configuration of any suitable software or data component in the system. Those configurations may be driven by new data, metadata or software updates in a release process.

In another embodiment, dependency manager may include a dependency tree for releasing a releasable file, such as releases of data, metadata, or software, or any other component of the system, to the system. The releasable file may require a configuration for dependencies that may be directly linked or wrapped around another component that is being configured, and so additional components or configuration may be required. Similarly, the dependency manager may keep a system-level dependency tree for all of the software and data components released into the system.

In a further embodiment, if any suitable software or data component is released in a dependency tree, dependency manager may create a deployable package to guarantee deployment integrity. That is, the deployment integrity may ensure a successful execution of any suitable software or data component, providing a desired result.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

FIG. 1 illustrates a block diagram connection 100 of supervisor 102 and dependency manager 104. Generally, supervisor 102 may monitor the system and/or execute processes and tasks that maintain an operating state for the system. Supervisor 102 may accept any suitable configuration requests to make changes in the system. Software or data configurations may be handled by nodes executing a dependency manager 104 software module or a supervisor 102 software module; however, the deployable package may be provided from a separate data frame. The separate data frame is a non-transitory machine-readable storage medium storing one or more releasable files used in preparing a deployable package according to a configuration.

According to one embodiment, the dependency manager 104 may be used as a non-transitory machine-readable storage medium containing the maintenance or configuration of any suitable software or data component in the system. Those configurations may be driven by new data, metadata or software updates in a release process.

The dependency manager 104 may play a role in configurations required by some processes in the system. That is, dependency manager 104 may be directly connected with supervisor 102 in order to provide the suitable dependencies, otherwise referred to as "packages," "configurations," "components," and/or "files," for the partitions, which may be used to update any suitable collection. Furthermore, supervisor 102 may be linked to one or more dependency managers 104 and may additionally be linked to one or more other supervisors 102, where additional supervisors 102 may be linked to other components in the system.

Figure 2:
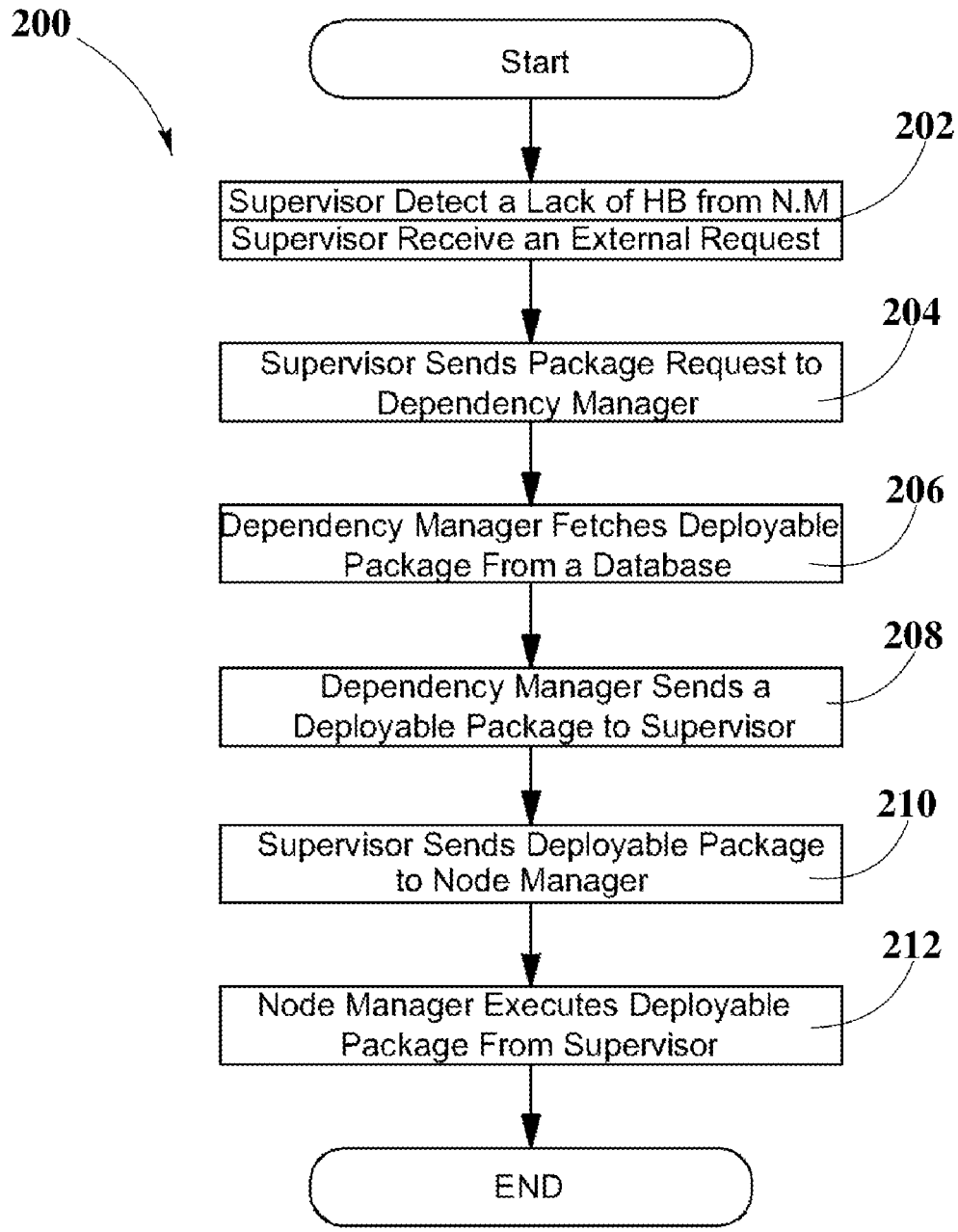
FIG. 2 is a flowchart diagram of a configuration process, according to an embodiment.

FIG. 2 is a flowchart diagram 200 of a configuration process in the system.

According to another embodiment, the configuration process or maintenance process may include the information regarding what dependencies a module may have and needs to be deployed along with the module. The required files may be fetched from a separate non-transitory machine-readable storage, or "data frame." In some embodiments, this data frame may be external from the system architecture; for example, in the case of third-party vendor providing software updates. The dependencies in a suitable deployable package may include different types of files, data, or software that are directly linked or wrapped around the module or the partition that is being configured. The configuration process may include different steps step 202, 204, 206, 208, 210, and 212. The configuration process 200 may begin in response to requests requiring the system to install or update, data or software components.

In a first step 202, processors of the system may automatically detect a situation that may trigger the configuration process 200 sequence/steps.

In some embodiments, in step 202, a node of the system executing a supervisor module may poll components of the system, such as node manager software modules, responsible for reporting a health update, or "status," to the supervisor. In such embodiments, the supervisor may automatically detect failures throughout the system based on a lack of a heartbeat (HB) signal the supervisor expects to receive from any system module, as defined by the system configuration. The supervisor may then trigger configuration process 200, among other remedial processes, in response to detecting the missing HB signal.

In some embodiments, in step 202, a node of the system executing a supervisor module may trigger configuration process 200 when the supervisor receives an external request for one or more changes in the system configuration, such as updates to a component or migration to new node hardware.

In step 204, the supervisor may send a request to the dependency manager to retrieve one or more deployment packages associated with one or more modules that are to be installed on the node. A deployment package defines each of the files and/or other materials required to satisfy the node configuration according to the dependency manager. The deployable package may contain all required dependencies, including source and destination information necessary for proper deployment and may contain module properties needed to configure or start the module. A particular dependency may have its own dependencies, also defined in the dependency manager, and therefore may be referred to as a dependency tree.

In step 206, the supervisor may transmit instructions to the dependency manager to fetch the required deployment packages from a data frame storing the deployment package. The data frame may be any non-transitory machine-readable storage media, which may be located on any suitable computing device communicatively coupled to a node executing the dependency manager. In some cases, when a deployment package is generated, the deployment package contains all dependencies for the module being transmitted, as well as the source and destination information needed to properly deploy the deployment package. The deployment package may also include one or more module properties needed to configure or start the deployment package. Deployment packages may be generated through automated or manual processes. In manual example, a system administrator may identify and/or create a deployment package with the requisite files and data. In an automated example, the supervisor or dependency manager may automatically identify and/or generate the deployment package using the automatically identified files, which is usually accomplished through a test script generated by the dependency manager, thereby yielding installation speeds and distribution rates higher than could be done by a human.

In step 208, after the dependency manager receives the deployment packages from the data frame, the dependency manager may transmit the deployable package to the node executing the supervisor that requested the deployment packages.

In step 210, the supervisor may send the deployable package to the node manager of the node requiring the configuration.

In step 212, the node manager may copy files, install, and/or execute the deployable package received from the supervisor, thereby implementing the requisite maintenance, update, or configuration for the system.

Figure 3:
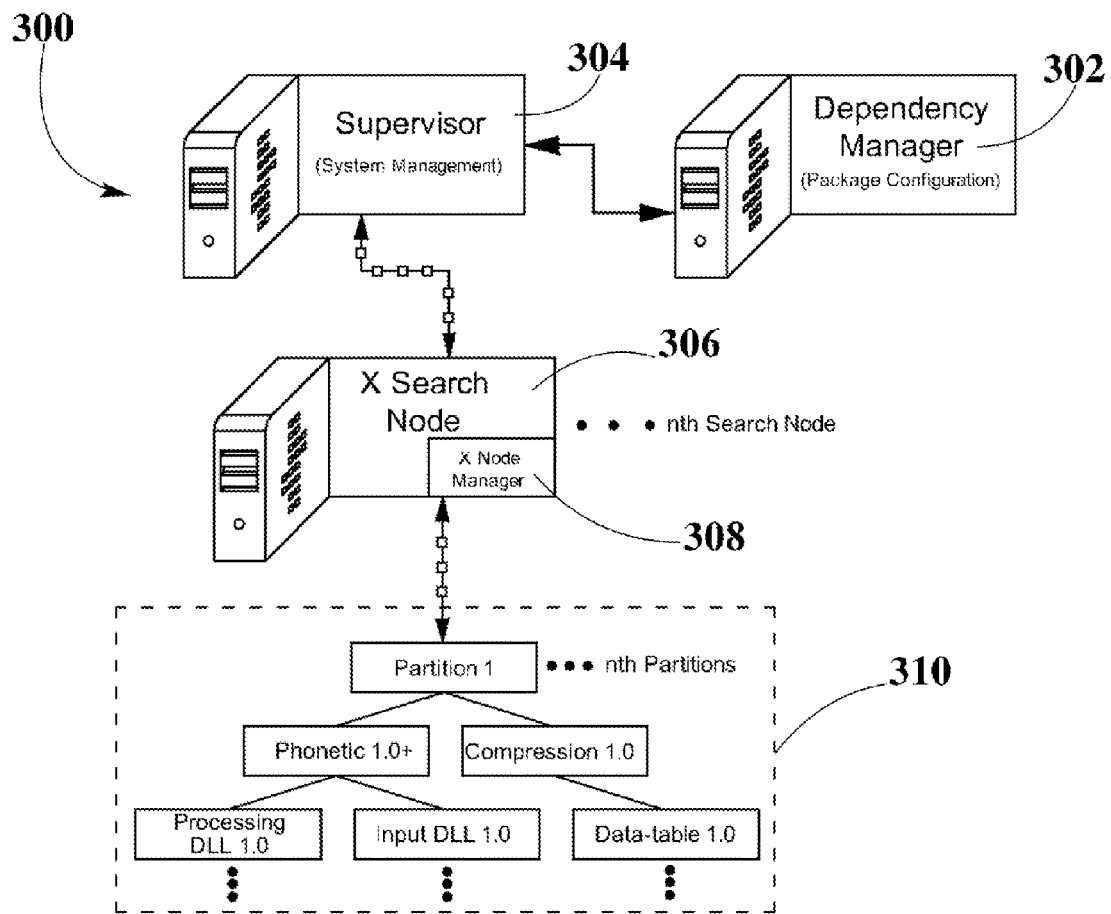
FIG. 3 illustrates a block diagram of dependencies used for the configuration of a system, according to an embodiment.

FIG. 3 illustrates block diagram of dependencies 300 used for the configuration of a system. According to a further embodiment, the process for the maintenance or configuration of a system may include different components, such as, dependency manager 302, supervisor 304, search node 306, node manager 308, and dependency tree 310, among others.

A dependency tree 310 may include different types of files that may be directly linked or wrapped around a module or partition, such that, a dependency may be the degree to which each member of a partition relies on each one of the other members in the partition. For instance, dependency tree 310 may include partition 1, which may depend on phonetic 1.0 and compression 1.0; subsequently, phonetic 1.0 may depend on software libraries (such as, processing DLL 1.0 and Input DLL 1.0), and compression 1.0 may depend on data-table 1.0 and so on.

The dependency manager 302 may store a dependency tree 310 associated with any releasable file of the system. In a further embodiment, if any suitable software or data component is released to components indicated within the dependency tree 310, the dependency manager 302 may create a deployable package from one or more files stored on a data frame.

Supervisor 304 may be linked to one or more dependency managers 302 including one or more dependency trees 310 for one or more modules, partitions, or suitable combinations thereof. Supervisor 304 may additionally be linked to one or more supervisor 304, where additional supervisors 304 may be linked to other components in the system.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

Figure 4:
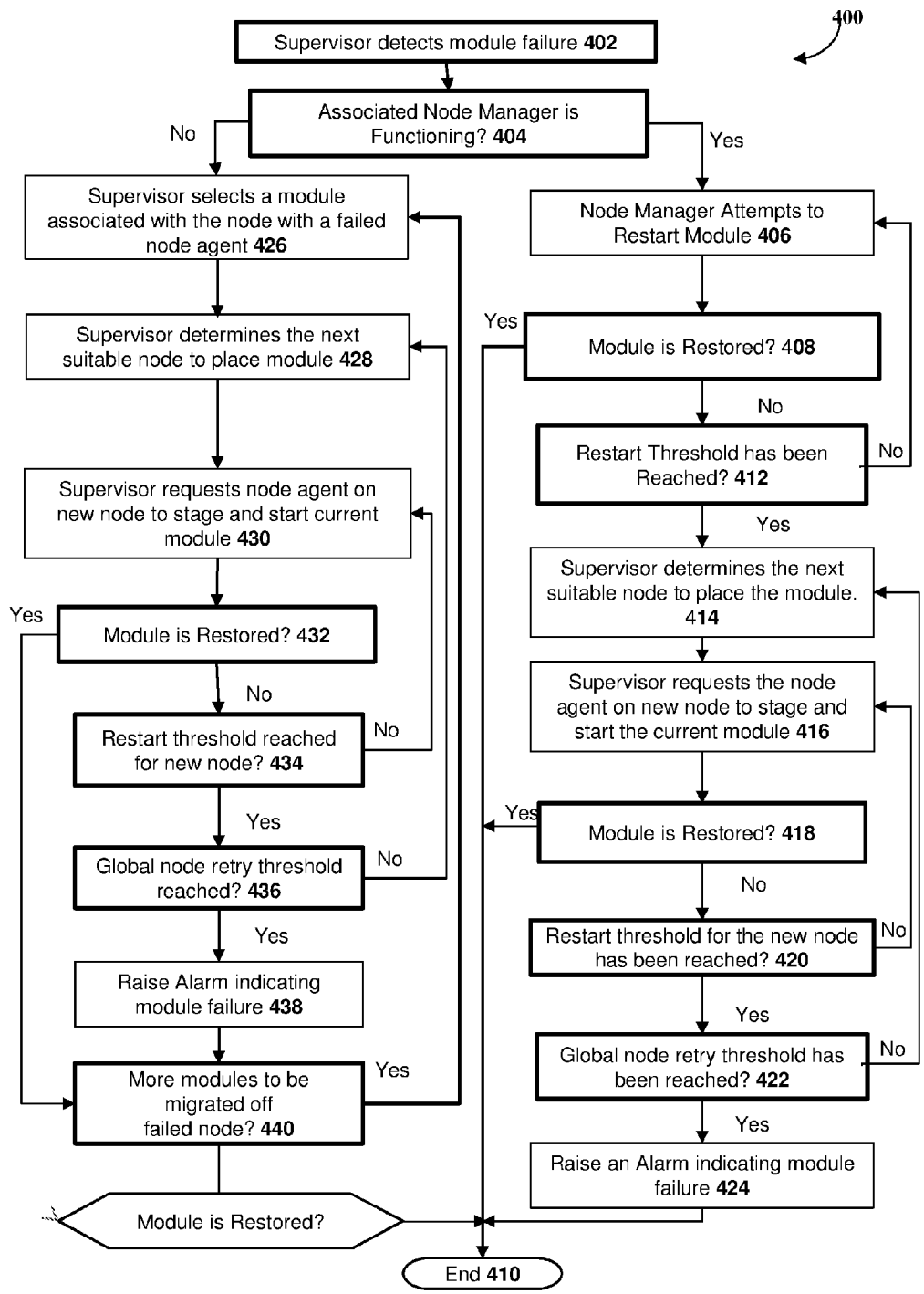
FIG. 4 is a flowchart showing fault handling by a distribute computing system, according to an exemplary method embodiment.

FIG. 4 is a flowchart for fault handling 400.

The supervisor maintains the definition and configuration of all data collections in the system, which may include settings per collection that indicate how many redundant copies of each partition are desired, how many times to try to restart failed components before moving them to another node, etc. The supervisor also maintains a list of available nodes and their resources, as provided by the node managers. From that information, the supervisor computes a desired system state by mapping the needed system modules to available nodes, while still complying with configuration settings. Fault handling 400 begins with supervisor detecting a module failure 402, where one or more supervisors may detect failures of one or more modules by comparing the actual system state to a desired system state. In one or more embodiments, supervisors may detect failure when one or more heartbeats from node managers or system modules are no longer detected. In one or more other embodiments, heartbeats from one or more modules may include status information about one or more other modules that may be interpreted by the one or more supervisors.

A supervisor may store definitions of data collections and the configurations settings associated with the data collections. The supervisor may also store information about available system resources, as reported by node managers. The configuration information may include settings per collection that indicate how many redundant copies of each respective partition are desired, how many times to try to restart failed components before moving them to another node, among other. From all this information, the supervisor derives a 'desired' system state that maps the needed system modules to available nodes, while still complying with configuration settings. All this information is represented as JSON objects which may be stored as JSON files on disk, or in a predefined data collection within the IMDB.

The supervisor may then detect if the associated node manager is functioning 404.

If the node manager associated with the one or more failed modules is functioning as desired or according to a status quo configuration, then supervisor may send one or more commands to the node manager instructing the node manager to attempt to restart the one or more failed modules, in a step 406.

The supervisor may then check if module is restored 408, and if so the process may proceed to end 410. In some implementations, the first action of any module is to report a status via heartbeats to one or more available supervisors. If it is determined that module function is not restored, as indicated by heartbeats, the supervisor may determine if the restart threshold has been reached 412. The threshold number of attempts is a configuration setting per collection, which may be set by the system administrator and stored with the supervisor. The supervisor determines that a module has failed and should be restarted or moved to another node. The supervisor sends commands to the node manager. If the number of attempts has not been reached, the node manager attempts to restart module 406.

If the threshold has been reached, the supervisor determines the next suitable node to place the module 414 and the supervisor requests the node manager on the new node to stage all module dependencies and start the current module 416.

The supervisor may then check if module is restored 418, and if so the process may proceed to end 410. If the module is not restored, the system may check if the restart threshold for the new node has been reached 420. If the threshold has not been reached, the supervisor requests the node manager on the new node to stage and start the current module 416.

Otherwise, the supervisor may check if the global node retry threshold has been reached 422. This value is also defined by a system administrator and may be stored with the supervisor in a script, or as JSON or similar data structure object. If the threshold has not been reached, the supervisor determines the next suitable node to place the module 414 and attempts to restart the node on the new node. If the global threshold has been reached, the system may then raise an alarm indicating module failure 424.

If the supervisor detects that the associated node manager is not functioning based on the corresponding heartbeats, as indicated by a lack of heartbeats or heartbeats from the node manager indicating a failed state, the supervisor selects a module associated with the node with a failed node manager 426. Then, the supervisor determines the next suitable node to place the module 428. Afterwards, the supervisor requests the node manager on the new node to stage and start the current module 430.

The supervisor may then check if module is restored 432. If the module is not restored, supervisor checks if the restart threshold for the new node has been reached 434. If the threshold has not been reached, the supervisor requests the node manager on the new node to stage and start the current module 430.

If the threshold has been reached, the supervisor then checks if the global node retry threshold has been reached 436. If the threshold has not been reached, the supervisor determines the next suitable node to place the module 428 and attempts to restart the node on the new node. If the global threshold has been reached, the system may then raise an alarm indicating module failure 438.

Otherwise, if the module is restored, the supervisor then checks if there are more modules to be migrated off the failed node 440. If a node has failed, the supervisor is configured to migrate all of the services that had been running on the failed node 440, as defined in the desired state. The supervisor will calculate a new desired state without the failed node 440 and will need to migrate services accordingly. In some implementations, the supervisor may select a module associated with the node having a failed node manager 426 and the node manager attempts to stage and start the module.

If the supervisor determines no more modules are to be migrated, the process may end 410.

In one or more embodiments, a node may fail and a supervisor may determine, based on information from node manager heartbeats, that no nodes have available resources. In some implementations, the node managers report their available resources in each corresponding heartbeat. The supervisor may then attempt to make resources available in other nodes in the system while maintaining a desired redundancy. In one or more embodiments, resources may be made available by unloading a module or partition. The supervisor may then load the desired module or partition on the available resources.

Example #1 illustrates what happens if a single module fails due to some resource no longer available on the node but the node itself is not otherwise adversely affected.

In this case, when the module fails the heartbeat connections to the supervisor are dropped, thereby alerting the supervisor to the module failure. The supervisor will attempt to reconnect to the module to check if the failure was just a connection issue or a module failure. In some embodiments, failure to reconnect is assumed to be a module failure.

The supervisor will first request the associated node manager to restart the module in place. Starting the module in place does not incur the cost of re-staging the module and any corresponding software or data, so can be accomplished more quickly than staging and starting on another node. However, in this example the problem is due to some resource unavailability on the specified node, thus the restart will also fail.

After making a predetermined number of attempts to restart the module in place, the supervisor will look for another suitable node to start the module on. The supervisor will contact a dependency manager to acquire the correct package required to deploy the failed module. The supervisor will then pass that package on to the node manager for the newly selected node to stage and run the module. The module finds the required resources on the new node and creates a heartbeat connection to the supervisor indicating it is running properly. The supervisor marks the functionality as restored and the event is over.

Example #2 illustrates a total node fail such as a failed power supply. In this case the node manager and all modules on the server drop their heartbeat connections to the supervisor. The supervisor recognizes this as a complete node failure and marks that node as failed and unavailable. The supervisor then walks through the list of modules that were allocated to that node. For each module in that list the supervisor will look for another suitable node to start the module on. The supervisor will contact a dependency manager to acquire the correct package required to deploy the current module. The supervisor will then pass that package on to the node manager for the newly selected node to stage and run the module. The module executes and creates a heartbeat connection to the supervisor indicating it is running properly. The supervisor marks the functionality as restored for that module. This continues until all modules have been reallocated to new nodes and the event is over.

What is claimed is:

1. A computer-implemented method comprising:
    transmitting, by a computer of a distributed computing system, to a dependency manager node a request for a machine-readable deployable package file associated with a target node, wherein the dependency manager node comprises a non-transitory machine-readable storage medium storing one or more deployable package files associated with one or more nodes of the system according to a dependency tree before receiving the request, wherein the one or more nodes comprise the target node;
    transmitting, by the computer, the deployable package file to the target node in response to receiving the deployable package file from the dependency manager node based on the request, wherein the deployable package file associated with the target node contains a set of one or more dependency files based on the dependency tree;
    instructing, by the computer, the target node to install the set of dependencies in the deployable package file onto the target node;
    receiving, by the computer, from each of the one or more nodes of the distributed computing system, a heartbeat signal indicating a status of the respective node at a predetermined interval;
    determining, by the computer, the status of each respective node based on each respective heartbeat signal;
    detecting, by the computer, a failure of one or more dependencies installed on the target node according to the heartbeat signal received from the target node, wherein the computer automatically requests the deployable package file from the dependency manager node responsive to detecting the failure;
    transmitting, by the computer, based on the automatic request of the deployable package file responsive to detecting the failure, the deployable package file to a manager of a new node on which the failure occurred such that the manager of the new node attempts to restore the deployable package file to address the failure; and
    determining, by the computer, if the manager of the new node successfully restored the one or more dependencies on the new node.

2. The method according to claim 1, wherein a dependency is selected from the group consisting of: a partition, a module, a file, and data.

3. The method according to claim 1, wherein the dependency manager node fetches a dependency from one or more one dataframes and compiles the deployable package file.

4. The method according to claim 1, wherein each respective dependency file in the deployable package file is determined by the dependency manager node using at least one dependency tree associated with the target node.

5. The method according to claim 4, wherein each respective dependency file in the deployable package file is based on a comparative relationship of the dependency file with a corresponding dependency file installed on a subset of one or more nodes in a system.

6. The method according to claim 1, further comprising receiving, by the computer, from a vendor server associated with a dependency file installed on a node of the system, a prompt to update the node having the dependency file associated with the vendor server, wherein the one or more dependency files of the deployable package file contains the dependency file associated with the vendor server.

7. A database management system comprising:
    one or more nodes comprising a non-transitory machine-readable storage memory storing one or more dependency files, and a processor monitoring a status of the one or more dependency files, wherein each respective dependency file is a component of a first node having a comparative relationship with a corresponding component installed on a second node, wherein the one or more nodes comprises the first node and the second node;
    one or more supervisor nodes comprising a processor periodically monitoring a health status for each of the one or more nodes and configured to transmit a deployable package comprising a set of dependencies files to each of the one or more nodes based on the health status of each respective node of the one or more nodes; and
    one or more dependency manager nodes comprising a non-transitory machine-readable storage medium storing one or more dependency tree files associated with the one or more nodes, and a processor configured to compile a deployable package file in accordance with a dependency tree associated with a node, wherein the deployable package file comprises a set of one or more dependencies files stored on at least one data frame, wherein the dependency manager node determines a dependency to include in the deployable package based on a dependency tree associated with a node targeted to receive the deployable package, wherein the processor of the one or more nodes is configured to transmit a heartbeat signal to the one or more supervisor nodes and monitor execution of one or more software modules installed on the one or more nodes, wherein the processor of the one or more supervisor nodes is configured to monitor one or more heartbeat signals received from the one or more nodes and determine a status of each respective node based on each respective heartbeat signal, wherein the processor of the one or more nodes is configured to attempt to restore a software module executed by the one or more nodes responsive to receiving a command to restore the software module from the one or more supervisor nodes, wherein the non-transitory machine-readable storage medium of the one or more dependency manager nodes stores one or more machine-readable configuration package files, wherein the processor of the one or more supervisor nodes is configured to determine a number of attempts to restore the software module by the one or more nodes, wherein the processor of the one or more supervisor nodes is configured to automatically retrieve from the one or more dependency manager nodes a configuration package file associated with the software module responsive to determining the number of attempts exceeds a threshold number of attempts to restore the software module.

8. The system according to claim 7, further comprising an external dataframe comprising a non-transitory machine-readable storage medium storing one or more machine-readable update files corresponding to one or more dependency files install updates for a dependency generated by a third-party dependency source; and
   a processor configured to transmit a request to a supervisor node to update a set of one or more nodes having the dependency of the third-party dependency source,
   wherein a dependency manager node compiles an update deployment package comprising the one or more dependency files install updates received from the data frame of the third-party dependency source.

9. The system according to claim 7, further comprising a new node comprising a processor executing a node manager module that transmits a new node status to a supervisor node and receives one or more deployment packages according to a dependency tree associated with the new node.

10. The system according to claim 7, wherein the one or more dependency manager nodes updates a dependency tree associated with a node when a request to update the dependency tree is received from a supervisor node.

11. The system according to claim 7, wherein a dependency is selected from the group consisting of: a partition, a module, a file, and data.

\* \* \* \* \*